United States Patent [19]

Ginster

[11] 4,324,826
[45] Apr. 13, 1982

[54] FINISHING AND SEALING STRIPS

[75] Inventor: Helmut Ginster, Viersen, Fed. Rep. of Germany

[73] Assignee: Draftex Development, A.G., Zug, Switzerland

[21] Appl. No.: 219,871

[22] Filed: Dec. 23, 1980

[30] Foreign Application Priority Data

Feb. 22, 1980 [GB] United Kingdom ............... 06100/80

[51] Int. Cl.³ .............................................. E06B 7/16
[52] U.S. Cl. ..................................... 428/122; 49/490; 52/716; 428/358
[58] Field of Search ............................... 428/122–358; 49/490–491; 52/716

[56] References Cited

U.S. PATENT DOCUMENTS

| | | | |
|---|---|---|---|
| 3,545,157 | 12/1970 | Cziptschirsch et al. | 428/122 X |
| 3,706,628 | 12/1972 | Azzola | 428/122 X |
| 4,232,081 | 11/1980 | Pullan | 428/358 X |

Primary Examiner—Henry F. Epstein
Attorney, Agent, or Firm—Leydig, Voit, Osann, Mayer & Holt, Ltd.

[57] ABSTRACT

A channel-shaped sealing strip comprises a channel-shaped metal core or carrier completely embedded in flexible plastics or rubber material which additionally defines gripping lips on the two opposite inside wall surfaces of the channel and running longitudinally along the strip. There are four relatively small such lips on one inside wall surface which are substantially equidistantly spaced from each other and the first or outermost one of which runs along the distal edge of its wall surface adjacent the mouth of the channel. There are two relatively larger such lips on the opposite inside wall surface. A soft rubber seal may be attached to the outside surface of the strip. The arrangement of the lips stabilises the strip against rocking or wobbling on a flange (e.g. a motor vehicle body flange around a door opening on which the strip may be mounted in use).

3 Claims, 4 Drawing Figures

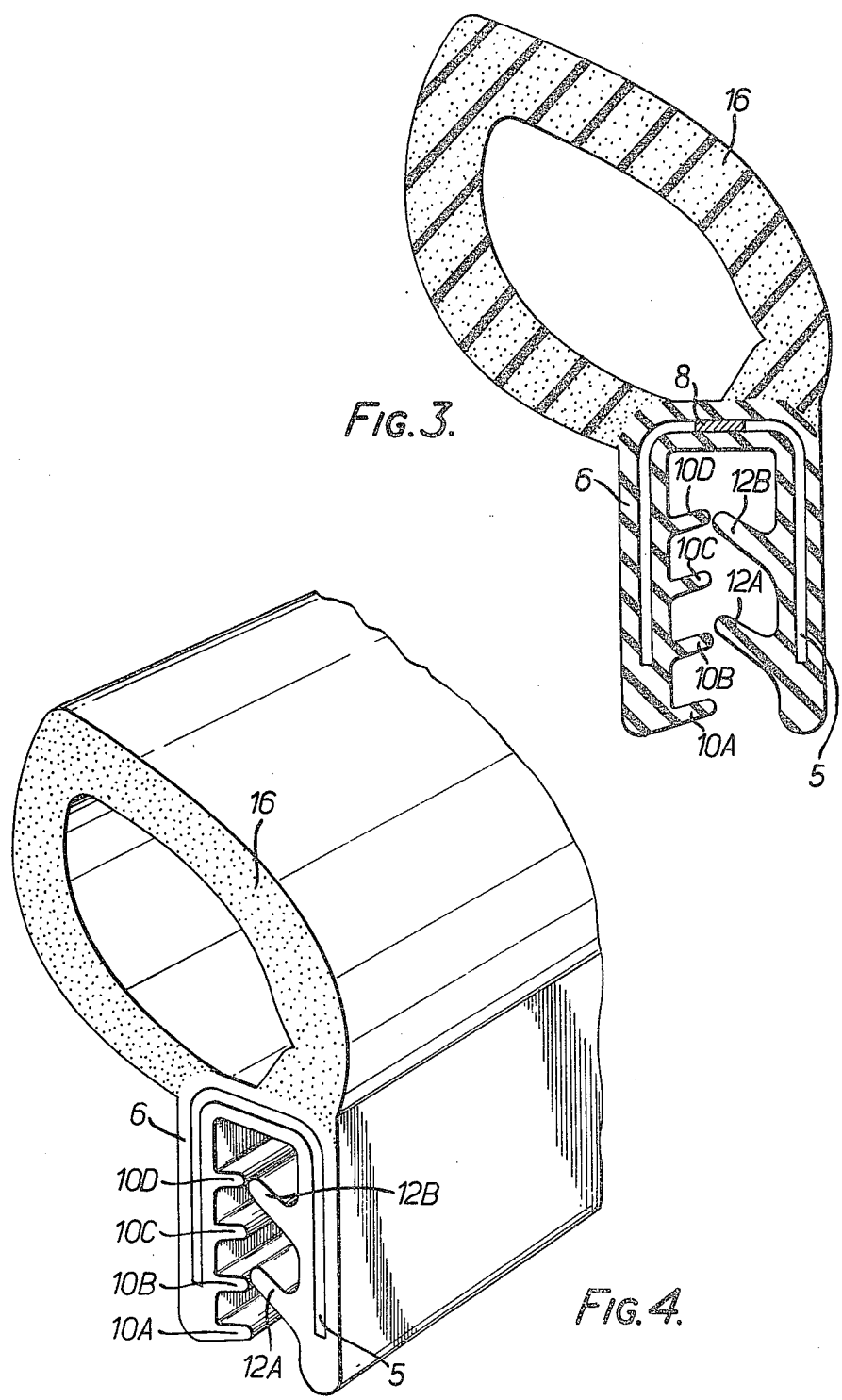

FINISHING AND SEALING STRIPS

BACKGROUND OF THE INVENTION

The invention relates to channel-shaped finishing and sealing strips particularly though not exclusively for use on vehicle bodies such as for covering bodywork flanges running around openings such as door or luggage compartment openings. When used in the latter manner, such a strip may carry a soft seal running along its outside surface and so positioned that, when the strip is mounted on the flange, a door of the body opening closes onto the seal to prevent entry of draughts and water.

It is important that such strips should effectively perform at least two functions: first, they should provide an effective seal on the flange so as to prevent the ingress of moisture (for example, moisture which might tend to pass around the inside of the channel of the strip and around the flange), and secondly they should be secure on the flange and free from any tendency to wobble, so as to hold any attached soft seal in the correct position continuously.

An object of the invention is an improved channel-shaped finishing or sealing strip.

A more specific object of the invention is a channel-shaped finishing or sealing strip having improved sealing and improved stability.

BRIEF SUMMARY OF THE INVENTION

According to the invention, there is provided a channel-shaped finishing and sealing strip incorporating channel-shaped resilient material from whose two opposite inside wall surfaces project inwardly directed lips running longitudinally along the strip, there being a plurality of such lips on each of the two opposite wall surfaces and one of the lips on one of the wall surfaces being positioned along the edge of that wall surface adjacent the mouth of the channel.

According to the invention, there is also provided a channel-shaped sealing strip, comprising a channel-shaped metal core or carrier completely embedded in flexible plastics or rubber material which additionally defines gripping lips on the two opposite inside wall surfaces of the channel and running longitudinally along the strip, there being four relatively small such lips on one said wall surface which are substantially equidistantly spaced from each other and the first of which runs along the distal edge of that wall surface adjacent the mouth of the channel and there being two relatively larger such lips on the opposite wall surface, one of the relatively larger lips having its distal edge adjacent the distal edge of the second relatively small lip and the other of the relatively larger lips having its distal edge adjacent the fourth or innermost one of the relatively small lips, and a soft rubber seal attached to and running along the outside surface of the strip.

DESCRIPTION OF DRAWINGS

Finishing and sealing strips embodying the invention will now be described, by way of example only, with reference to the accompanying diagrammatic drawings in which:

FIG. 3 is a cross-section through another one of the strips; and

FIG. 4 is a perspective view of the strip of FIG. 3.

DESCRIPTION OF PREFERRED EMBODIMENTS

Figure 1:
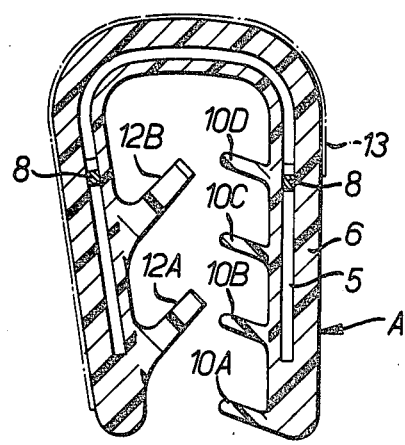
FIG. 1 is a cross-sectional view through one of the strips.

As shown in FIG. 1, the sealing strip comprises a channel-shaped metal core or carrier 5 which is completely embedded in plastics material 6. The carrier 5 may take any suitable form. For example, it may comprise a series of inverted U-shaped elements arranged side-by-side so as to define a channel and each either connected to the adjacent elements by short flexible connecting links or not connected. By way of example, the carrier 5 in FIG. 1 is shown as being of the form in which the U-shaped elements are connected together by short connecting links 8 each of which joins one leg of one of the elements to a corresponding point on the adjacent leg of the next element. The connecting links 8 may be arranged to fracture in use. Other forms of carrier may be used instead; for example, the carrier may comprise loops of wire formed into channel shape.

The plastics material 6 is formed on its inner surface with gripping and sealing lips 10A, 10B, 10C and 10D on one inside wall surface and gripping and sealing lips 12A and 12B on the opposite inside wall surface. These lips extend along the full length of the channel. As will be seen, the four lips 10A to 10D are of reduced size as compared with the lips 12A and 12B and are arranged more nearly perpendicular to the side surface from which they project than are the lips 12A and 12B.

It will also be noted that the distal end of the lips 12A is positioned just above the distal end of the second lip 10B, while the distal end of the lip 12B is almost opposite the distal end of the fourth lip 10D.

Additionally, it will be noted that the first or outermost small lip 10A is positioned to run along the edge of the side wall of the channel from which it projects.

The sealing strip may be manufactured by extruding plastics material onto the carrier 5 (e.g. when the carrier 5 is in the form of a flat metal blank, it being subsequently bent up into channel form). Such extrusion may be carried out using a cross-head extruder of known form. The extrusion process may be such as to form the gripping lips 10A to 10D and 12A and 12B simultaneously with the channel-shaped plastics material 6.

Advantageously, the extrusion process may be such that the plastics material of the gripping lips is softer than the channel-shaped plastics material 6. Instead, for example, the plastics material of the gripping lips on one side of the channel could be softer than the channel-shaped plastics material 6 while the gripping lips on the opposite side of the channel could be of the same hardness as the plastics material 6.

At least part of the external surface of the plastics material 6 may be printed or embossed to improve its appearance as indicated at 13.

A soft sealing member, for example a tubular-shaped member made of rubber, may be secured to the outside surface (for example the part of the surface marked A) so as to run along the length of the strip.

In use, the strip is placed onto a mounting flange 14 (see FIG. 2) running around an opening, such as a door opening, in a vehicle body and grips the flange so as to cover and protect it and to provide a sealing surface onto which the door of the opening closes. The sealing process is enhanced by the provision of the soft sealing member referred to above.

Figure 2:
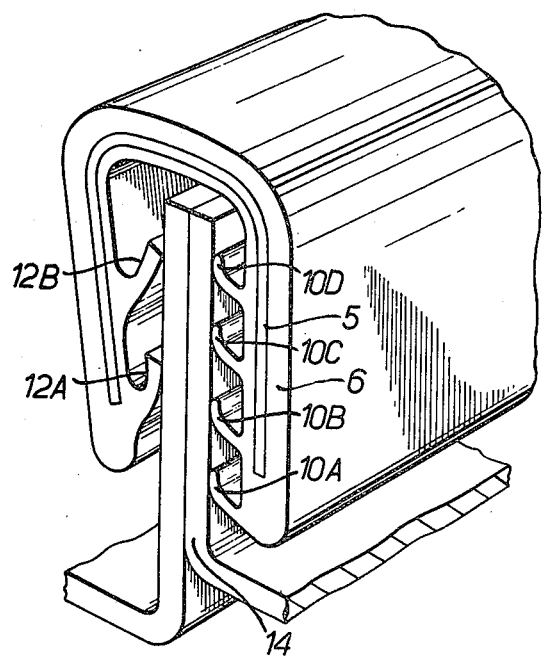
FIG. 2 is a perspective view of the strip of FIG. 1.

When the strip is pushed onto the flange, as shown diagrammatically in FIG. 2, the gripping lips 10A to 10D and 12A and 12B press against the opposite side surfaces of the flange 14 and provide a sealing and gripping effect. Thus, they help to prevent water or moisture from entering the inside of the strip through the mouth of the channel, travelling around the inside of the channel, and past the edge of the flange, thus passing from the outside to the inside of the vehicle body. This sealing function is enhanced by the positioning of the small lip 10A along the edge of the channel wall to which it is attached.

Use of the four small lips 10A to 10D on one side of the channel and the two larger lips 12A and 12B on the opposite side is found to be advantageous. It stabilises the strip against wobbling or rocking movement on the flange. The strip is found to be relatively easy to push onto the flange but has a high resistance to removal. The enhanced sealing which is provided by the lips removes or reduces any requirement to place a sealing mastic or the like inside the channel.

Parts in FIGS. 3 and 4 corresponding to parts in FIGS. 1 and 2 are correspondingly referenced.

The strip of FIGS. 3 and 4 is primarily intended for fitting onto a flange running around a luggage compartment opening of a vehicle body. For this reason, the metal carrier 5, which again is shown purely by way of example as comprising a series of U-shaped elements arranged side-by-side, is in the form in which each element is connected to the next by a connecting link 8 positioned, in this case, along the inverted base of the channel. This is because the particular application (for fitting to luggage compartment openings) requires the strip to be readily bendable in a horizontal plane—in contrast to the strip of FIGS. 1 and 2 where the primary bending is in the vertical plane.

The strip of FIGS. 3 and 4 also differs in that its channel-shaped flexible covering material 6 is rubber instead of plastics. The arrangement of the four small gripping lips 10A to 10D, and the larger gripping lips 12A and 12B, is similar to that in FIGS. 1 and 2, but the lips in FIGS. 3 and 4 are formed in rubber.

The strip of FIGS. 3 and 4 carries a tubular rubber seal 16 which is shown attached to the inverted base of the strip.

Advantageously, the seal 16 is made of sponge rubber while the channel-shaped rubber 6 and the lips 10A to 10D and 12A and 12B are solid rubber.

The sealing strip may be manufactured by an extrusion process which involves extruding rubber onto the metal carrier 5, again possibly while it is in the form of a flat metal blank as in the case described above with reference to FIGS. 1 and 2. Such extrusion may be used to form the seal 16 simultaneously (a duplex extrusion process being used so that the seal is in sponge rubber and the remainder in solid rubber).

The arrangement of the gripping lips 10A to 10D and 12A and 12B produces the same advantages as discussed above with reference to FIGS. 1 and 2.

The improved weather sealing provided by the first or outermost small lip 10A is such that the strip does not need the outwardly and downwardly projecting additional sealing lips sometimes attached to the outside of sealing strips intended for luggage compartment openings.

What is claimed is:

1. A channel-shaped finishing and sealing strip, comprising
    channel-shaped resilient material defining two opposite inside wall surfaces, a base and a mouth and having embedded within it a channel-shaped flexible reinforcing carrier, and
    lips attached to and running longitudinally along the strip and projecting inwardly from both opposite inside wall surfaces and inclined therefrom towards the base, there being four substantially equidistantly spaced relatively small lips on one said wall surface and two substantially equidistantly spaced relatively larger said lips on the other wall surface,
    one of the relatively smaller lips on the other of the wall surfaces being positioned along the edge of that wall surface adjacent the said mouth.

2. A strip according to claim 1, having a soft sealing member attached to and running along its outside surface.

3. A channel-shaped sealing strip, comprising
    a channel-shaped metal carrier,
    channel-shaped flexible plastics or rubber material completely embedding the carrier and defining gripping lips on the two opposite inside wall surfaces of the channel and running longitudinally along the strip,
    there being four relatively small such lips on one side wall surface which are substantially equidistantly spaced from each other and the first of which runs along the distal edge of that wall surface adjacent the mouth of the channel and there being two relatively larger such lips on the opposite wall surface, one of the relatively larger lips having its distal edge adjacent the distal edge of the second relatively small lip and the other of the relatively larger lips having its distal edge adjacent the fourth or innermost one of the relatively small lips, and
    a soft rubber seal attached to and running along the outside surface of the strip.

* * * * *